No. 688,669.  
T. F. McEVILLY.  
DOMESTIC BOILER.  
Application filed July 20, 1901.  
Patented Dec. 10, 1901.
(No Model.)
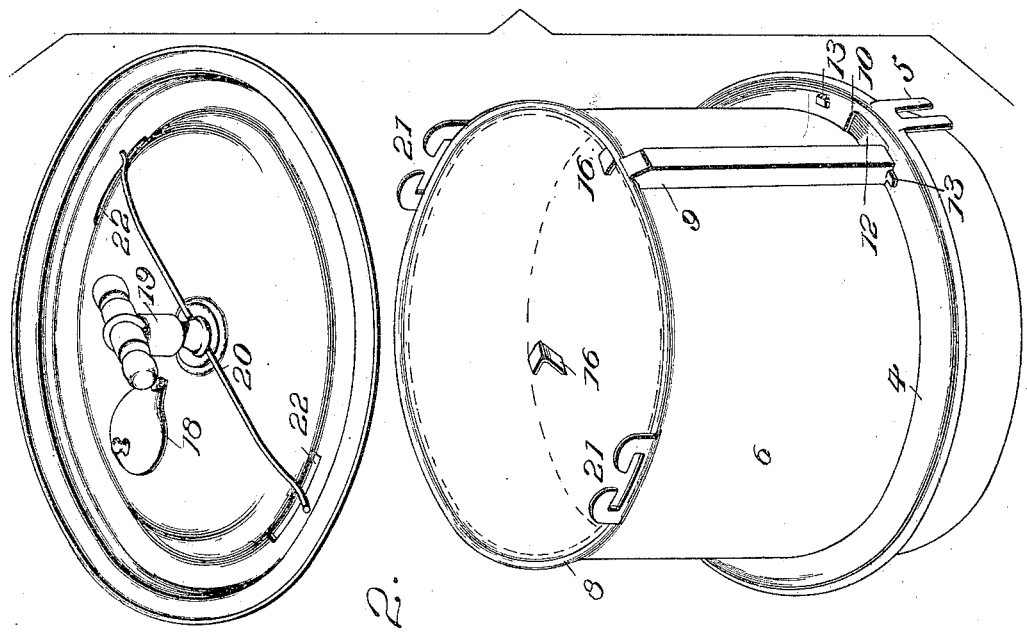
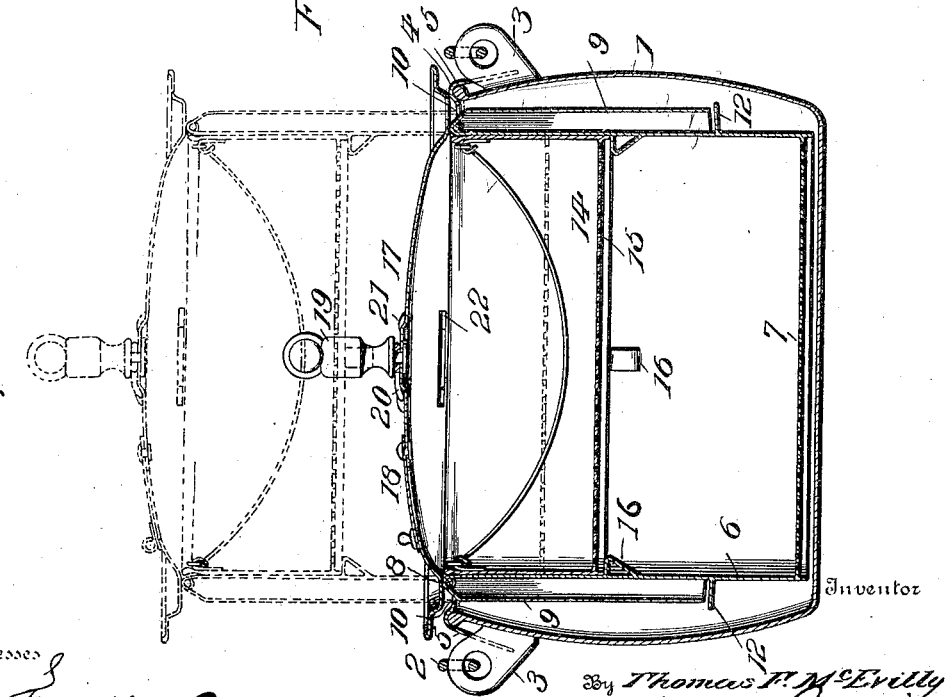

UNITED STATES PATENT OFFICE.

THOMAS F. McEVILLY, OF WILMINGTON, DELAWARE, ASSIGNOR OF ONE-HALF TO JOHN F. MALLOY, OF WILMINGTON, DELAWARE.

DOMESTIC BOILER.

SPECIFICATION forming part of Letters Patent No. 688,669, dated December 10, 1901.

Application filed July 20, 1901. Serial No. 69,039. (No model.)

*To all whom it may concern:*

Be it known that I, THOMAS F. MCEVILLY, of Wilmington, in the county of Newcastle and State of Delaware, have invented certain new and useful Improvements in Domestic Boilers; and I do hereby declare the following to be a full, clear, and exact description of the invention, such as will enable others skilled in the art to which it appertains to make and use the same.

This invention relates to domestic boilers.

The objects of the invention are, first, to provide means whereby the articles cooked may be thoroughly strained before removal from the pot and without danger of scalding the operator; secondly, to provide simple and efficient means whereby articles of different kinds may be cooked simultaneously in one boiler, and, thirdly, to provide means for the purposes stated which will be applicable to boilers already in use.

The invention will be hereinafter fully set forth, and particularly pointed out in the claims.

In the accompanying drawings, Figure 1 is a vertical sectional view showing the inner vessels in their raised position in dotted lines. Fig. 2 is a view in perspective, showing the inner vessel locked in its raised position, the boiler and inner pot being omitted.

Referring to the drawings, 1 designates an ordinary domestic boiler of any suitable ware, having a handle 2 and ears 3.

4 is a ring fitted on the upper edge of the boiler, and 5 two opposite depending slotted plates for engaging ears 3 to prevent axial turning of the ring and yet permit of the easy removal thereof.

6 designates an inside pot or vessel formed with a foraminous bottom 7 and a bead 8 on its upper edge, designed to rest upon ring 4 when the pot is lowered. This pot is formed at diametrically opposite points with outwardly-projecting guides 9, which are designed to fit in slots 10 of ring 4. Also surrounding pot 6 is a horizontal flange 12, located in fixed relation to guides 9, so as to leave spaces between the latter and the flange sufficient to accommodate ring 4. The upward vertical movement of pot 6 is limited by flange 12 acting as a stop upon engaging ring 4, whereupon by turning the pot axially the lower ends of guides 9 will be brought above ring 4 to one side or the other of slots 10, such axial movement being limited by lugs 13. When thus elevated and locked, all liquid within pot 6 can drain back into boiler 1.

Within pot 6 is a second pot or vessel 14, also formed with a foraminous bottom 15, which rests upon lugs 16, projecting inwardly from pot 6. Articles placed within pot 14 may be cooked simultaneously with the cooking of those within pot 6, and when the latter is raised, as before described, liquid or moisture within pot 14 will also be free to drain therefrom.

17 is the cover for the boiler and pots. It is equipped with a fork-opening closed by a disk 18 and also with a central axially-movable handle 19, to which is secured a transversely-arranged rod 20. This rod at its ends is bent to engage the hooked or overhanging ends of short posts 21, extending upwardly from pot 6 through slots 22 of the cover. The space between adjacent posts is such that when the cover is first positioned the rod will pass freely between the posts, and then by turning the handle axially such rod will engage diagonally opposite posts. When thus engaged, the pots 6 and 14 may be elevated along with the cover by grasping handle 19.

The advantages of my invention are apparent. It will be especially observed that two articles of food may be cooked simultaneously and that when the cooking is completed all water within the pots may be drained back into the boiler by holding the former elevated and locked in place.

A further advantage resides in the fact that while the draining is taking place the contents of the two pots will be kept warm by the heat arising from the boiler.

Another and highly important advantage is that the improvements call for no change in the construction of the boiler and may be applied to such as are now in use, the added features being entirely removable by disengaging the slotted plates 5 from ears 3.

I claim as my invention—

1. The combination with the boiler, of the ring supported thereby having slots, a pot designed to rest on said ring when in its lowered position, guides on the outside of the pot working in said slots, a second pot having a foraminous portion and located within and supported by the former pot, and stops on the exterior of the first-mentioned pot, adjacent to the lower ends of the guides, for engaging the under side of the ring when the lower ends of the guides are above the latter, substantially as set forth.

2. The combination with a boiler, of a pot or vessel located therein having a foraminous portion, vertical guides secured to such pot, a ring removably secured to the boiler forming a support for the pot in its lowered and raised positions, said ring having slots therein for said guides, and an annular plate surrounding the pot just below the lower ends of the guides for engaging the under side of the ring as the lower ends of the guides are above the latter, and lugs on said ring for limiting the axial movement of the pot when the guides are in the last-mentioned position, substantially as set forth.

3. The combination with the boiler, of the ring resting thereon, means for holding such ring as against axial turning, said ring having inner slots, the pot having vertical guides fitted in said slots and means on the exterior of the pot, near the lower ends of the guides, for engaging the under side of the ring when the pot is elevated and turned axially with the guides resting on the ring, substantially as set forth.

4. The combination with the boiler, having bail-ears, of the ring having slotted plates for engaging said ears, said ring resting on the boiler and also having inner slots, the pot having vertical guides fitted in said slots and means on the exterior of the pot, near the lower ends of the guides, for engaging the under side of the ring when the pot is elevated and turned axially with the guides resting on the ring, substantially as set forth.

5. The combination with the pot having upwardly-extended hooks arranged in pairs, of the cover having opposite slots to accommodate such hooks, the centrally-arranged pivoted handle, and the cross-rod secured thereto designed to fit between the hooks of each pair of hooks and engage diagonally opposite hooks by the axial turning of the handle, substantially as set forth.

In testimony whereof I have signed this specification in the presence of two subscribing witnesses.

THOMAS F. McEVILLY.

Witnesses:
FRANCIS J. BYRNE,
WM. J. BYRNE.